(12) United States Patent
Krueger et al.

(10) Patent No.: US 9,738,186 B2
(45) Date of Patent: Aug. 22, 2017

(54) BLAST ENERGY ATTENUATING RECOVERABLE SEAT INSERT

(71) Applicant: Oshkosh Defense, LLC, Oshkosh, WI (US)

(72) Inventors: Kristopher J. Krueger, Oshkosh, WI (US); Andrew J. Morello, Oshkosh, WI (US); Scott A. Mueller, Oshkosh, WI (US); Micah C. Richmond, Omro, WI (US); Anthony J. Seefeldt, Omro, WI (US); Timothy J. Snyder, Oshkosh, WI (US); Randall Sullwold, Oshkosh, WI (US); Anthony R. Trofka, DePere, WI (US); Harold Vincent, Oshkosh, WI (US); Brian E. Wilkins, Appleton, WI (US); David M. Woller, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

(21) Appl. No.: 15/192,387

(22) Filed: Jun. 24, 2016

(65) Prior Publication Data
US 2016/0375805 A1  Dec. 29, 2016

Related U.S. Application Data

(60) Provisional application No. 62/185,426, filed on Jun. 26, 2015.

(51) Int. Cl.
*B60N 2/42* (2006.01)
*B60N 2/50* (2006.01)
(Continued)

(52) U.S. Cl.
CPC .......... *B60N 2/4249* (2013.01); *B60N 2/502* (2013.01); *B60N 2/525* (2013.01); *F41H 7/046* (2013.01)

(58) Field of Classification Search
CPC ...... B60N 2/42; B60N 2/4242; B60N 2/4249; B60N 2/502; B60N 2/525; F41H 7/046
See application file for complete search history.

(56) References Cited

U.S. PATENT DOCUMENTS

| 2,012,042 A | 5/1935 | Gerlofson et al. |
|---|---|---|
| 3,301,591 A | 1/1967 | Edwards |

(Continued)

FOREIGN PATENT DOCUMENTS

| EP | 1352780 B9 | 1/2006 |
|---|---|---|
| EP | 1650076 B1 | 6/2012 |
| WO | WO 2014/089333 A1 | 6/2014 |

OTHER PUBLICATIONS

U.S. Appl. No. 14/612,100, filed Feb. 2, 2015, Oshkosh Defense, LLC.

(Continued)

*Primary Examiner* — Gregory Blankenship
(74) *Attorney, Agent, or Firm* — Foley & Lardner LLP

(57) ABSTRACT

A vehicle includes a chassis and a seating system. The seating system includes a frame coupled to the chassis, a seat cushion supported by at least one of the frame and a floor of the vehicle, a first recoverable insert configured to provide a first energy attenuation response, and a second recoverable insert configured to provide a second energy attenuation response different than the first energy attenuation response. The seat cushion defines a cavity shaped to interchangeably receive either the first recoverable insert or the second recoverable insert to thereby selectively vary an energy attenuation provided by the seating system.

7 Claims, 11 Drawing Sheets

(51) Int. Cl.
   *B60N 2/52* (2006.01)
   *F41H 7/04* (2006.01)

(56) References Cited

U.S. PATENT DOCUMENTS

| | | | |
|---|---|---|---|
| 3,308,491 A | 3/1967 | Spence et al. | |
| 4,634,176 A | 1/1987 | Scott | |
| 4,682,818 A | 7/1987 | Morell | |
| 4,699,427 A * | 10/1987 | Kobayashi | B29D 99/0092 |
| | | | 297/452.27 |
| 4,753,480 A | 6/1988 | Morell | |
| 5,088,747 A | 2/1992 | Morrison et al. | |
| 5,106,161 A * | 4/1992 | Meiller | A47C 27/146 |
| | | | 297/452.46 |
| 5,108,790 A | 4/1992 | Babcock | |
| 5,226,188 A | 7/1993 | Liou | |
| 5,288,135 A | 2/1994 | Forcier et al. | |
| 5,395,162 A | 3/1995 | Jay et al. | |
| 5,407,247 A | 4/1995 | Forcier et al. | |
| 5,690,384 A | 11/1997 | Rossi | |
| 6,108,832 A | 8/2000 | McIntire | |
| 6,135,562 A * | 10/2000 | Infanti | A47C 13/005 |
| | | | 297/440.14 |
| 6,161,238 A | 12/2000 | Graebe | |
| 6,688,686 B1 | 2/2004 | McEvoy et al. | |
| 6,901,617 B2 | 6/2005 | Sprouse, II et al. | |
| 7,178,874 B2 | 2/2007 | Demski | |
| 7,377,589 B1 | 5/2008 | Glater | |
| 7,621,580 B2 | 11/2009 | Randjelovic et al. | |
| 7,862,116 B2 | 1/2011 | Bredl | |
| 7,938,485 B1 | 5/2011 | Perciballi et al. | |
| 8,033,600 B2 | 10/2011 | Reynolds et al. | |
| 8,398,170 B2 | 3/2013 | Walker | |
| 8,459,735 B2 | 6/2013 | Van Zyl et al. | |
| 8,672,411 B2 * | 3/2014 | Gomes | B60N 2/5635 |
| | | | 297/180.13 |
| 8,943,946 B1 | 2/2015 | Richmond et al. | |
| 8,955,859 B1 | 2/2015 | Richmond et al. | |
| 8,967,699 B1 | 3/2015 | Richmond et al. | |
| 8,990,985 B1 * | 3/2015 | Wilhelm | A47C 7/20 |
| | | | 5/653 |
| 9,045,014 B1 | 6/2015 | Verhoff et al. | |
| 9,174,686 B1 | 11/2015 | Messina et al. | |
| 9,328,986 B1 | 5/2016 | Pennau et al. | |
| 9,329,000 B1 | 5/2016 | Richmond et al. | |
| 9,366,507 B1 | 6/2016 | Richmond et al. | |
| 2003/0122407 A1 * | 7/2003 | Boyd | B60N 2/01508 |
| | | | 297/130 |
| 2008/0309128 A1 | 12/2008 | Schneider et al. | |
| 2011/0126698 A1 * | 6/2011 | Ripley | F41H 7/046 |
| | | | 89/36.08 |
| 2011/0241391 A1 | 10/2011 | Lamparter et al. | |
| 2014/0007761 A1 | 1/2014 | Haidar | |
| 2014/0054940 A1 | 2/2014 | Walker | |
| 2015/0165950 A1 | 6/2015 | Sachs et al. | |
| 2016/0375805 A1 * | 12/2016 | Krueger | B60N 2/4249 |
| | | | 297/216.1 |

OTHER PUBLICATIONS

U.S. Appl. No. 14/724,279, filed May 28, 2015, Oshkosh Defense, LLC.
U.S. Appl. No. 14/930,416, filed Nov. 2, 2015, Oshkosh Defense, LLC.
International Search Report and Written Opinion regarding PCT Application No. PCT/US2016/039359, mail date Feb. 21, 2017, 33 pps.

* cited by examiner

US 9,738,186 B2

BLAST ENERGY ATTENUATING RECOVERABLE SEAT INSERT

CROSS-REFERENCE TO RELATED PATENT APPLICATIONS

This application claims the benefit of U.S. Provisional Patent Application No. 62/185,426, filed Jun. 26, 2015, which is incorporated herein by reference in its entirety.

BACKGROUND

Military vehicles are often provided with blast seats. The blast seats traditionally include frames that move within the cabin to dissipate blast energy. Increasing the level of protection afforded by the blast seat requires replacing at least a substantial portion of the blast seat and, in some instances, replacing the entire blast seat.

SUMMARY

One exemplary embodiment relates to a vehicle that includes a chassis and a seating system. The seating system includes a frame coupled to the chassis, a seat cushion supported by at least one of the frame and a floor of the vehicle, a first recoverable insert configured to provide a first energy attenuation response, and a second recoverable insert configured to provide a second energy attenuation response different than the first energy attenuation response. The seat cushion defines a cavity shaped to interchangeably receive either the first recoverable insert or the second recoverable insert to thereby selectively vary an energy attenuation provided by the seating system.

Another exemplary embodiment relates to a seating system for a vehicle that includes a frame configured to be coupled to a chassis of the vehicle, a seat cushion supported by at least one of the frame and a floor of the vehicle, a first recoverable insert configured to provide a first energy attenuation response, and a second recoverable insert configured to provide a second energy attenuation response different than the first energy attenuation response. The seat cushion defines a cavity shaped to interchangeably receive either the first recoverable insert or the second recoverable insert to thereby selectively vary an energy attenuation provided by the seating system.

Still another exemplary embodiment relates to a seating system for a vehicle that includes a frame, a seat cushion supported by at least one of the frame and a floor of the vehicle and defining a cavity, and an insert. The insert is configured to attenuate at least one of a blast energy and a crash energy, and the insert is removably positioned within the cavity such that the seating system is selectively reconfigurable between an A-kit configuration and a B-kit configuration.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
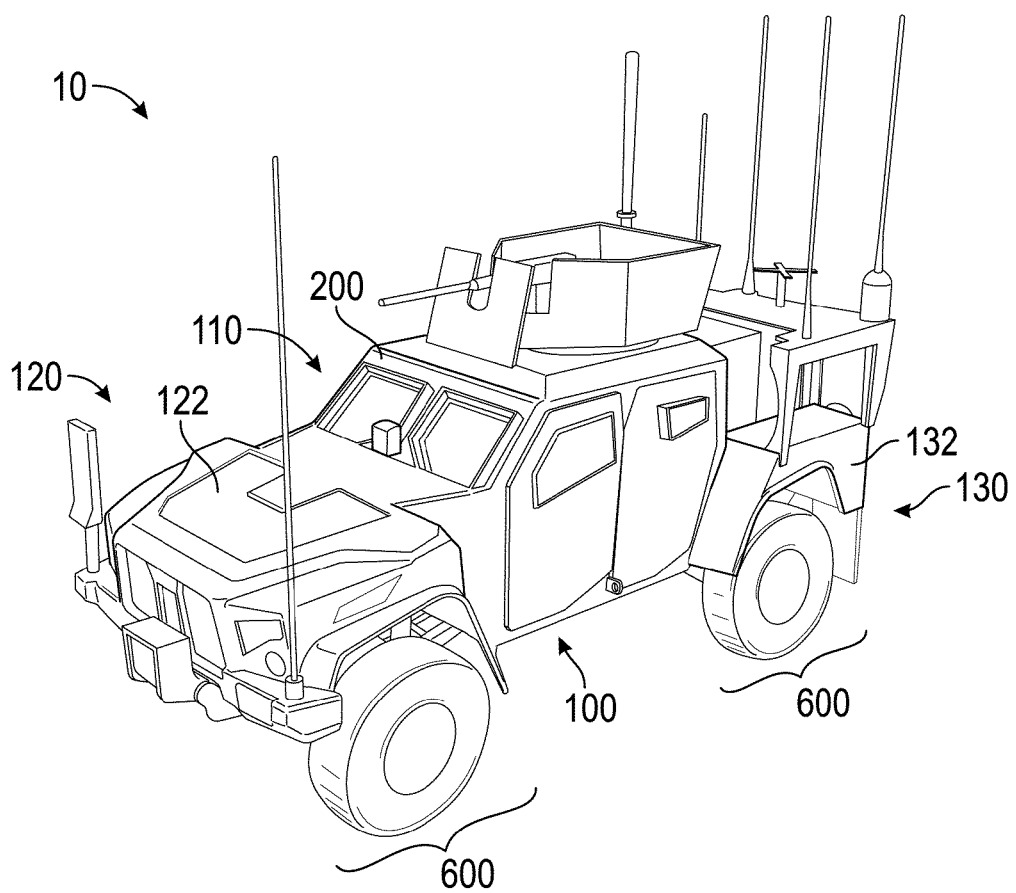
FIG. 1 is a perspective view of a vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, an energy attenuating (EA) seat (e.g., a blast seat, etc.) is configured to attenuate energy from an impact (e.g., an acceleration due to an explosion, an acceleration due to a crash, etc.). EA seats are typically configured as stroking blast seats that include a stroking mechanism configured to actuate (e.g., stroke, up and down, etc.) in order to attenuate (e.g., weaken, reduce, mitigate, etc.) the energy of the impact on the occupant. Traditional stroking blast seats may be substantially heavy, costly, and complex to manufacture and install. Further, in order to switch between a standard seat (e.g., an A-kit) and a blast seat (e.g., a B-kit, etc.), the entire seat in some cases must be removed and replaced. The seat of the present disclosure includes an insert that may be interchanged to reconfigure the seat as an EA seat or a standard seat without removing the seat from a vehicle (e.g., a military truck, another type of truck, a plane, a helicopter, etc.). The blast seat configuration provides energy attenuation without the high costs, weight, and complexities of the stroking mechanism of traditional blast seats. The seat may include one or more cavities configured to receive the insert. The insert may be a standard insert (e.g., a foam cushion, etc.) or an energy attenuating insert (e.g., made of an energy attenuating material, shaped or otherwise designed to attenuate energy, etc.). The seat is configured to interchangeably receive the standard insert and the energy attenuating insert. By way of example, the insert may be easily removed from the seat to facilitate switching between inserts and/or inspecting the insert. According to an exemplary embodiment, the energy attenuating insert is configured to attenuate energy from an impact on a vehicle to reduce an amount of energy transferred to an occupant. The energy attenuating insert may be positioned on and/or within the blast seat to mitigate vertical inputs (e.g., from an impact to a bottom or top of a vehicle, etc.), lateral inputs (e.g., from an impact to a side of a vehicle, etc.), longitudinal inputs (e.g., from an impact to a front or rear of a vehicle, etc.), or any combination thereof.

The EA seat may include an identification system to provide the user with quick verification of which configuration the seat is in. The seating system may additionally or alternatively contain a system that manages the temperature of the insert to ensure its response will occur as designed. The inserts and frame are designed such that the occupant is protected even while sitting off-center of the seat and such that while stroking into the insert the occupant does not come into contact with structures that may cause injury. The seating system may stand alone or be combined with a seating system where the frame also strokes (e.g., a traditional stroking EA seat, etc.) to provide additional occupant protection.

Referring to FIG. 1, a vehicle, shown as military vehicle 10, includes a hull and frame assembly 100, an armor assembly 200, and wheel and tire assemblies 600. In other embodiments, the vehicle is an aircraft (e.g., an airplane, a helicopter, etc.), a troop carrier, a tank, a passenger vehicle, a semi-truck, an off-road vehicle, an all-terrain vehicle, a utility task vehicle, a motorcycle, a dirt bike, a snowmobile, construction equipment (e.g., a skid loader, a telehandler, etc.), and/or still another type of vehicle. According to an exemplary embodiment, the military vehicle 10 includes an engine, a transmission, a transaxle, a braking system, a fuel system, and a suspension system coupling the hull and frame assembly 100 to the wheel and tire assemblies 600. According to an exemplary embodiment, the military vehicle 10 includes a power generation system. In some embodiments, the military vehicle 10 is configured to pull a trailer.

As shown in FIG. 1, the hull and frame assembly 100 includes a passenger capsule, shown as cabin 110, a front module, shown as front module 120, and a rear module, shown as rear module 130. According to an exemplary embodiment, the front module 120 and the rear module 130 are coupled to the cabin 110 with a plurality of interfaces. As shown in FIG. 1, the front module 120 includes a front axle having wheel and tire assemblies 600. The front module 120 includes a body panel, shown as hood 122. In some embodiments, the hood 122 at least partially surrounds the engine of the military vehicle 10. As shown in FIG. 1, the rear module 130 includes a body assembly, shown as bed 132.

Figure 2:
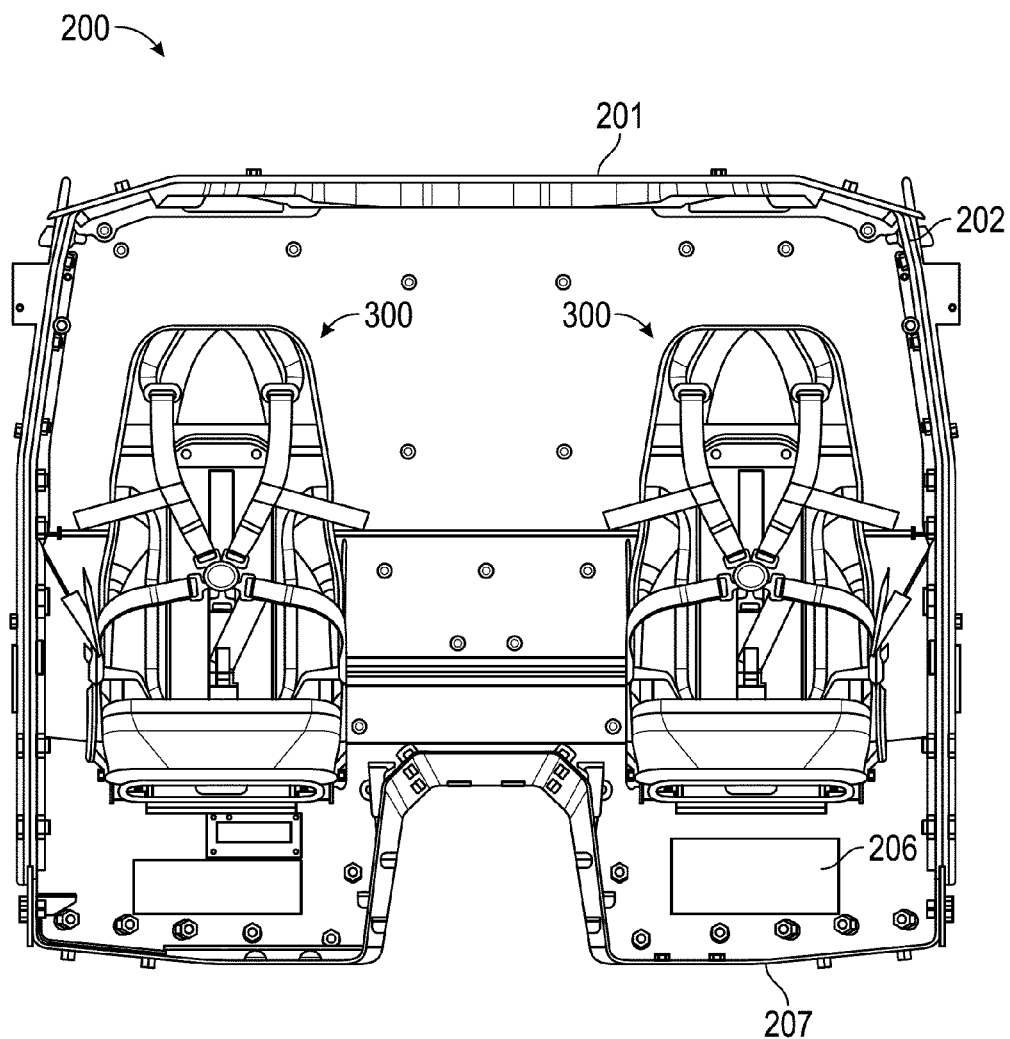
FIG. 2 is a schematic sectional view of a vehicle having a passenger capsule, according to an exemplary embodiment.

Referring now to FIG. 2, the armor assembly 200 includes a passenger capsule assembly 202. The passenger capsule assembly 202 includes a roof 201, footpads 206, a floor 207, and seats, shown as blast energy attenuating recoverable ("BEAR") seats 300. The footpads 206 may be positioned and/or configured to protect the passenger's feet. As shown in FIGS. 1 and 2, the passenger capsule assembly 202 is a main passenger compartment of the vehicle. The passenger capsule assembly 202 may be configured to encapsulate and/or provide a space for one or more seats for the operator (e.g., driver, etc.) and one or more occupants of the vehicle. In an alternative embodiment, the passenger capsule assembly 202 is a troop carrier disposed on and/or within another portion of a vehicle (e.g., the bed 132 of the military vehicle 10, etc.). According to an exemplary embodiment, the BEAR seats 300 are configured to reduce the magnitude, duration of shock, and/or acceleration applied to the occupant (e.g., during an impact, an explosion, etc.). In one embodiment, the BEAR seats 300 are fixedly coupled to the floor 207 with a bracket. In other embodiment, the BEAR seats 300 are fixedly coupled to another portion of the passenger capsule assembly 202 (e.g., a back and/or roof mounting bracket, anywhere a passenger could sit within or on the military vehicle 10, etc.). In an alternative embodiment, the BEAR seats 300 include a shock mechanism movably coupling the BEAR seats 300 to the passenger capsule assembly 202.

Figure 3:
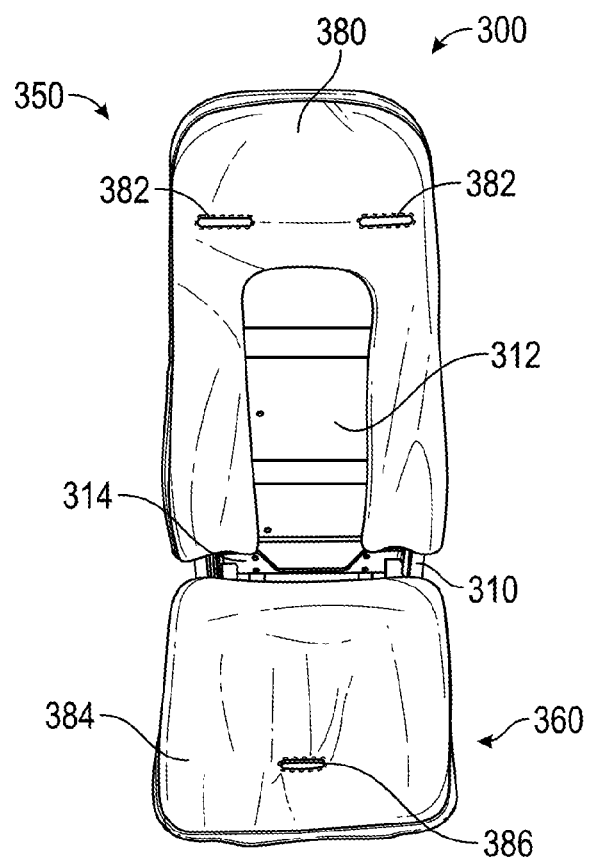
FIGS. 3-6 are various views of a seat associated with the passenger capsule of FIG. 2.
Figure 4:
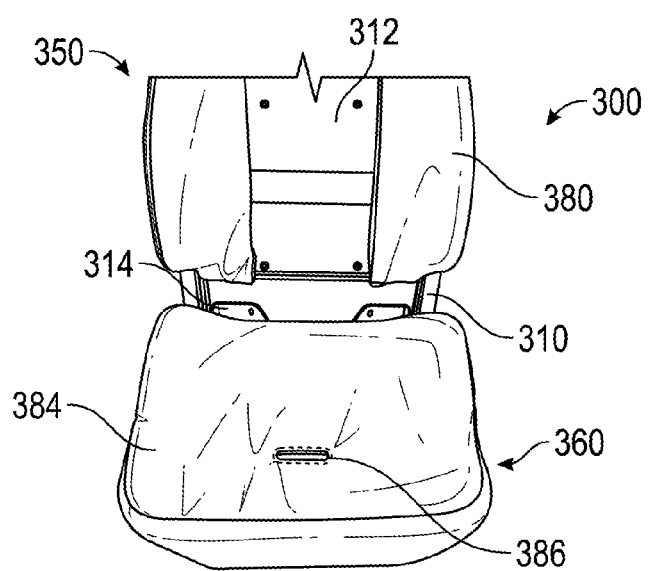
Figure 9:
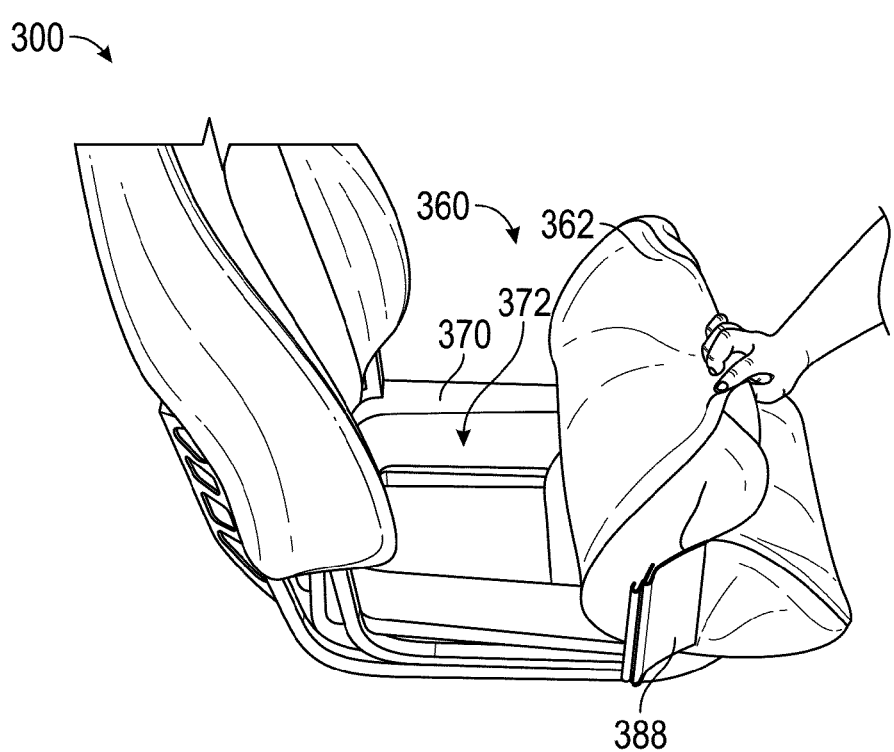
Figure 10:
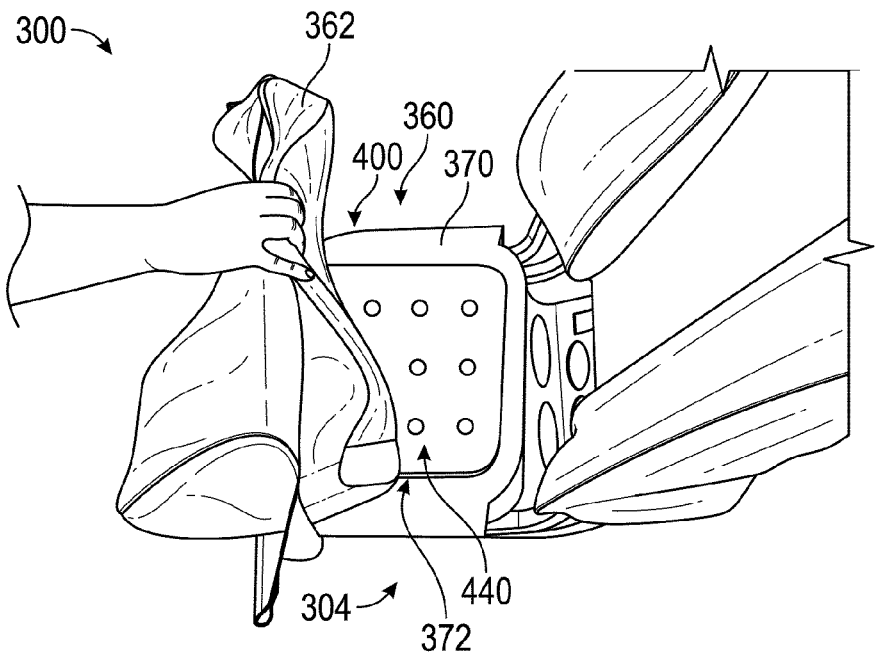
Figure 11:
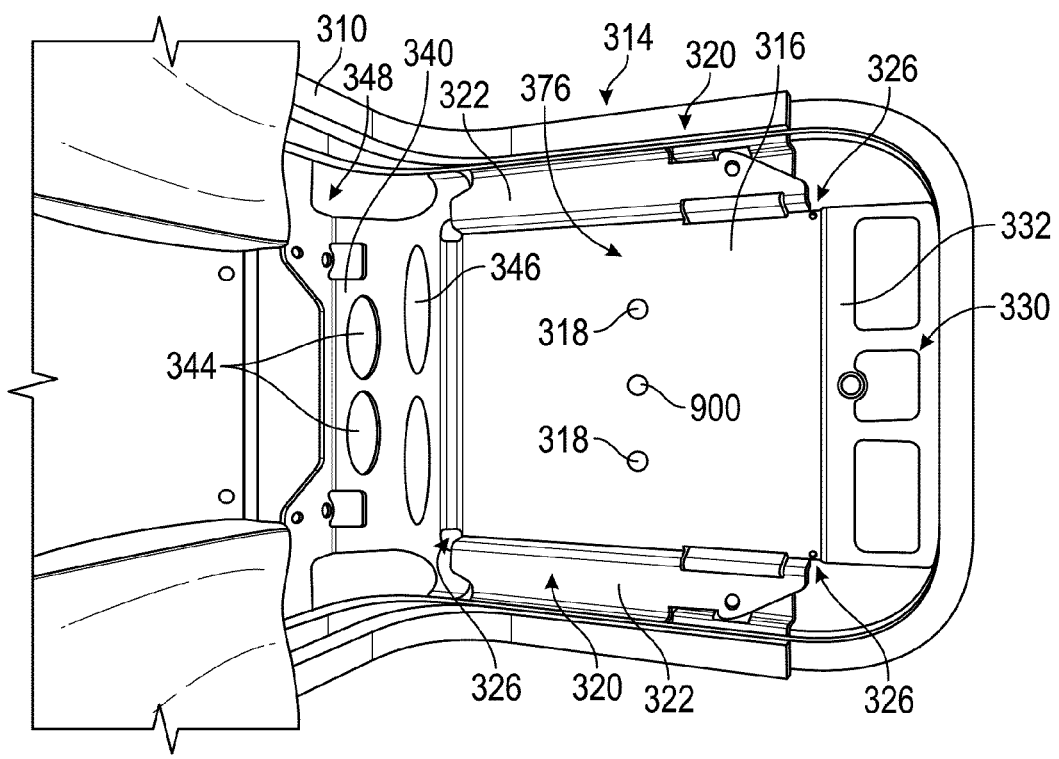
FIGS. 11-12 are various views of a seat pan of a seat, according to an exemplary embodiment.

According to the exemplary embodiment shown in FIGS. 3-14, the BEAR seat 300 includes a frame, shown as frame 310, having a first support member, shown as back support 312, coupled to a second support member, shown as seat pan 314 (e.g., bolted, welded, fastened, etc.). As shown in FIG. 11, the seat pan 314 includes a plate, shown as plate 316. The plate 316 includes a plurality of brackets that extend therefrom, including a pair of side brackets, shown as side brackets 320, a front bracket, shown as front bracket 330, and a rear bracket, shown as rear bracket 340. As shown in FIG. 11, the side brackets 320 and the front bracket 330 extend from the plate 316 to couple the seat pan 314 to other components of the frame 310 (e.g., via welding, fasteners, etc.). The side brackets 320 and the front bracket 330 include a flat surface, shown as seat cushion surface 322 and seat cushion surface 332, respectively. According to an exemplary embodiment, the plate 316 is offset (e.g., recessed, etc.) a distance from the seat cushion surface 322 and the seat cushion surface 332 defining a recess, shown as cavity 376. As shown in FIGS. 3-6, the BEAR seat 300 includes a first portion, shown as back portion 350, and a second portion, shown as seat portion 360. The back portion 350 and the seat portion 360 are coupled to the back support 312 and the seat pan 314, respectively. As shown in FIGS. 3-4, the BEAR seat 300 includes a first cover, shown as back cover 380, configured to cover the back portion 350. The BEAR seat 300 includes a second cover, shown as seat cover 384, configured to cover the seat portion 360. The back cover 380 and the seat cover 384 may be made of various suitable materials (e.g., cloth, leather, etc.).

Figure 5:
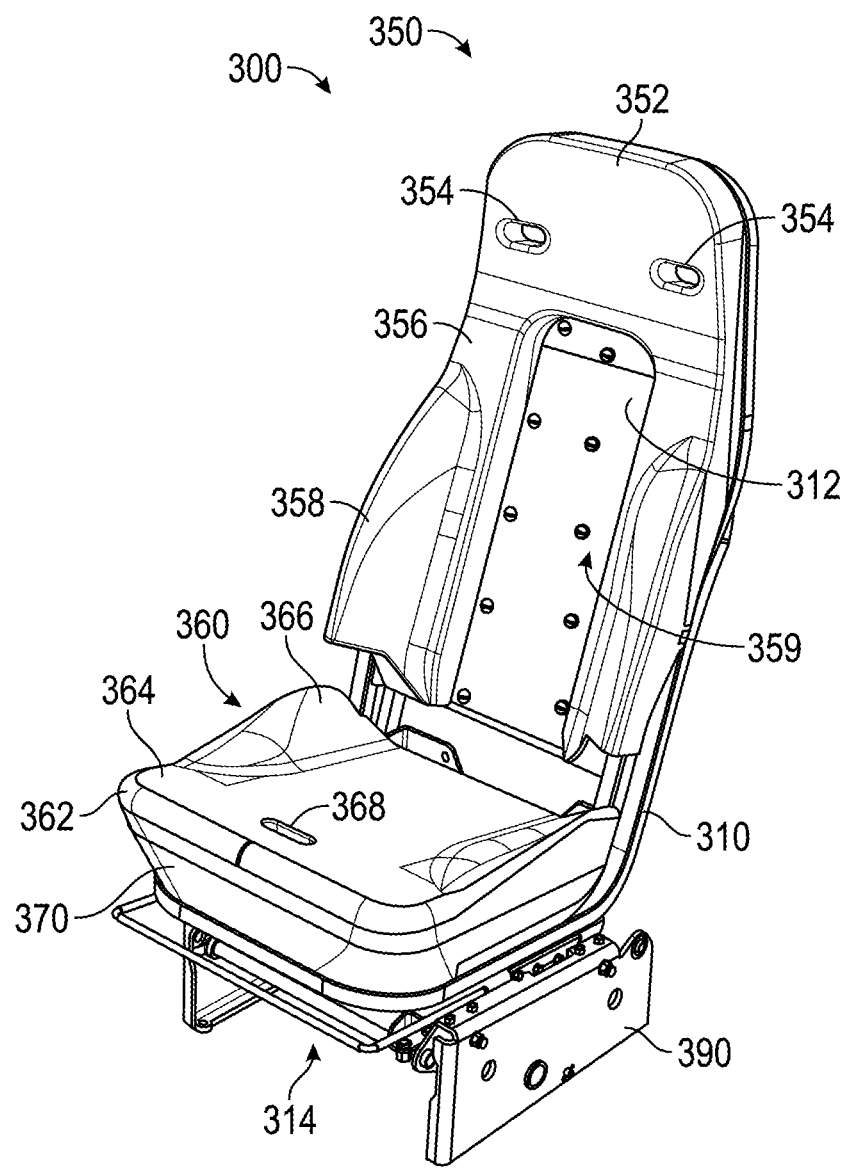
Figure 6:
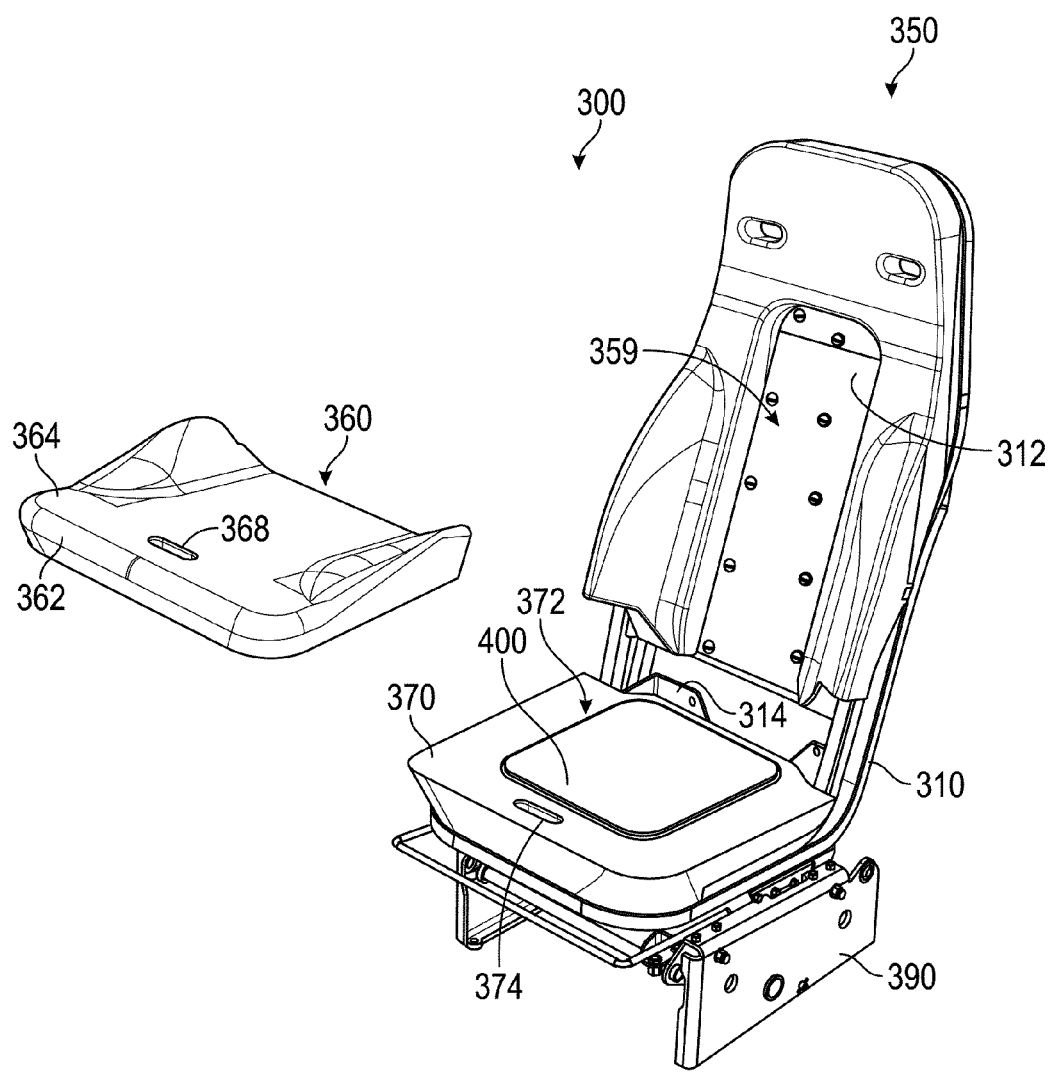

As shown in FIGS. 5-6, the back portion 350 includes an upper portion, shown as head rest 352, and a lower portion, shown as back rest 356. In some embodiment, the back rest 356 includes a pair of supports, shown as side bolster supports 358. As shown in FIGS. 3 and 5-6, the head rest 352 and the back cover 380 define a pair of corresponding apertures, shown as restraint apertures 354 and restraint apertures 382, respectively. The restraint apertures 354 and the restraint apertures 382 are positioned to receive restraints (e.g., straps, belts, clasps, etc.) of a restraint system (e.g., a harness, a seat belt, etc.) of the BEAR seat 300. As shown in FIGS. 5-6, the back portion 350 defines a cavity, shown as back cavity 359.

As shown in FIGS. 5-6, the seat portion 360 includes a top portion, shown as upper seat cushion 362, and a bottom portion, shown as lower seat cushion 370. According to an exemplary embodiment, the lower seat cushion 370 rests on the seat cushion surface 322 and the seat cushion surface 332 of the seat pan 314. According to an exemplary embodiment, the upper seat cushion 362 and the lower seat cushion 370 are made of foam. In other embodiments, the upper seat cushion 362 and/or the lower seat cushion 370 are made of another material. As shown in FIGS. 5-6, the upper seat cushion 362 includes a surface, shown as surface 364, upon which an occupant of a vehicle may sit. In some embodiments, the upper seat cushion 362 includes a pair of supports, shown as bolsters 366. As shown in FIGS. 3-6, the upper seat cushion 362, the lower seat cushion 370, and the seat cover 384 define a set of corresponding apertures, shown as restraint aperture 368, restraint aperture 374, and restraint aperture 386, respectively. The restraint aperture 368, the restraint aperture 374, and the restraint aperture 386 are positioned to receive a portion (e.g., straps, belts, clasps, buckle etc.) of the restraint system of the BEAR seat 300.

As shown in FIGS. 5-6, the BEAR seat 300 includes a bracket, shown as floor mount 390. The floor mount 390 is configured to couple the BEAR seat 300 to a floor surface (e.g., the floor 207, etc.) of a vehicle. In one embodiment, the floor mount 390 fixes the BEAR seat 300 to the floor surface. In other embodiments, the BEAR seat 300 does not include the floor mount 390 and is otherwise coupled to the vehicle (e.g., by coupling the back support 312 to a vertical support member, etc.). In an alternative embodiment, the BEAR seat 300 includes a stroking mechanism configured to facilitate movement of the BEAR seat 300 relative to the floor surface.

As shown in FIG. 6, the upper seat cushion 362 and the lower seat cushion 370 are able to be decoupled from one another (e.g., after the removal of the seat cover 384, etc.) to access an insert, shown as seat insert 400. According to the exemplary embodiment shown in FIG. 6, the seat insert 400 is disposed within a cavity, shown as seat cavity 372, such that the upper seat cushion 362 and the lower seat cushion 370 surround and enclose the seat insert 400. In other embodiments, the seat cover 384 defines the seat cavity 372. In some embodiments, the seat cavity 372 extends through the entire thickness of the lower seat cushion 370 such that the seat insert 400 is disposed within the cavity 376 and along the plate 316 of the seat pan 314. In other embodiments, the seat cavity 372 extends partially through the lower seat cushion 370 such that the seat insert 400 rests on a bottom surface of the lower seat cushion 370. In yet another embodiment, the seat insert 400 is positioned above or below the seat portion 360. In an alternative embodiment, the seat insert 400 is accessible by only removing the seat cover 384 (e.g., the upper seat cushion 362 is omitted, the upper seat cushion 362 and the lower seat cushion 370 form a unitary seat portion 360 with a cavity that receives the seat insert 400, the seat insert 400 sits on top of the seat portion 360, etc.). In other alternative embodiments, an underside of the BEAR seat 300 is configured to receive the seat insert 400 therethrough (e.g., the through the seat pan 314, etc.).

In some instances, a person (e.g., an occupant of the military vehicle 10, etc.) sitting in the BEAR seat 300 may be in a position that is biased towards the front of the seat portion 360 (e.g., slouching, etc.). In other instances, a person sitting in BEAR seat 300 may be positioned laterally offset towards a side (e.g., right side, left side, etc.) of the seat portion 360. According to an exemplary embodiment, the seat insert 400 is sized to provide sufficient support for various sitting positions of an occupant (e.g., reducing the risk that the occupant will slide off of the front of the seat insert 400 when slouching, extends laterally to support laterally-biased seating positions, etc.).

In some embodiments, the seat insert 400 is otherwise oriented, in another position, and/or the BEAR seat 300 includes a plurality of inserts. In one embodiment, the BEAR seat 300 additionally or alternatively includes a back insert disposed within the back cavity 359 of the back portion 350. In other embodiments, the BEAR seat 300 additionally or alternatively includes a lumbar insert disposed within at least one of the side bolster supports 358 and the bolsters 366. An insert may additionally or alternatively be positioned within the head rest 352.

Referring now to FIGS. 7A-12, the seat insert 400 may be designed to include various different features (e.g., structure, shape, properties, etc.) and/or made from various different materials. According to an exemplary embodiment, the seat insert 400 is interchangeable such that the BEAR seat 300 is reconfigurable to accommodate different needs and/or uses of the BEAR seat 300 (e.g., between a standard seat in a noncombatant/non-up-armored vehicle and an EA seat in a military vehicle/up-armored vehicle, etc.) without the need for different seats (e.g., designs, models, etc.). Thus, a single seat may be used for multiple applications (e.g., reducing the need for two differently-designed seats, etc.).

Figure 7A:
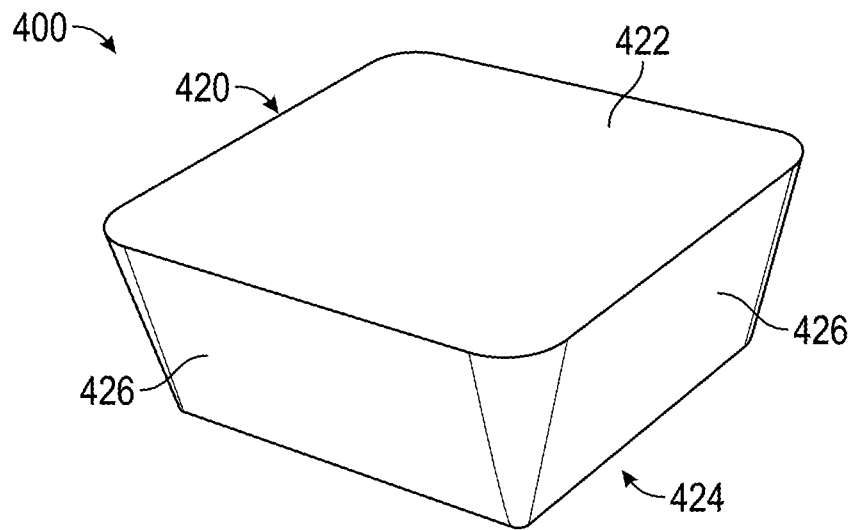
FIGS. 7A-7B are perspective views of a first energy attenuating insert and a second energy attenuating insert, according to an exemplary embodiment.
Figure 8:
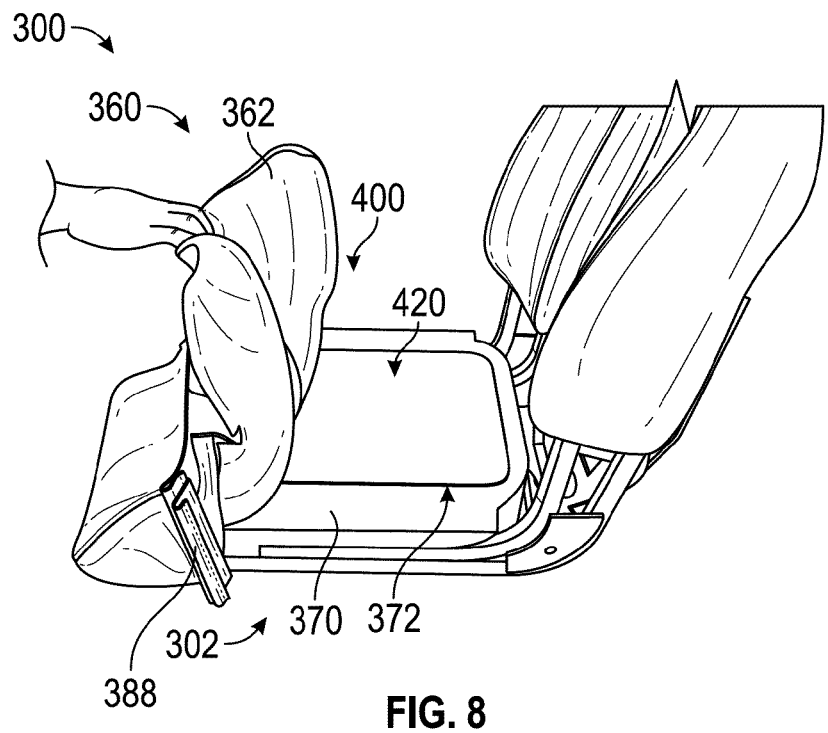
FIGS. 8-10 are various views of a seat disassembly process for interchanging an energy attenuating insert, according to various exemplary embodiments.

As shown in FIGS. 7A and 8, the seat insert 400 is configured as a first insert, shown as standard insert 420. According to an exemplary embodiment, the standard insert 420 is manufactured using a foam-based material. In one embodiment, the foam-based material of the standard insert 420 is the same as or similar to the material of the upper seat cushion 362 and/or the lower seat cushion 370. As shown in FIG. 7A, the standard insert 420 has a first surface, shown as top surface 422, and an opposing second surface, shown as bottom surface 424. According to an exemplary embodiment, the top surface 422 and the bottom surface 424 are spaced a distance apart (e.g., defining a height of the standard insert 420, etc.) to correspond with the depth of the seat cavity 372 within the seat portion 360. In other embodiments, the top surface 422 and the bottom surface 424 are spaced a different distance apart such that the standard insert 420 is recessed within or extends from the seat cavity 372. As shown in FIG. 7A, the standard insert 420 includes an edge, shown as insert edge 426, that extends around the periphery of the standard insert 420. According to the exemplary shown in FIG. 7A, the insert edge 426 is tapered and corresponds with a tapered edge of the seat cavity 372 to securely hold standard insert 420 in place, while still allowing easy removal of the standard insert 420 from the seat cavity 372. In other embodiments, the insert edge 426 is otherwise shaped (e.g., curved, straight, etc.). As shown in FIG. 8, the standard insert 420 is disposed within the seat cavity 372 of the seat portion 360 and positioned between the lower seat cushion 370 and the upper seat cushion 362. Thus, the BEAR seat 300 is in a first configuration, shown as standard configuration 302 (e.g., A-kit configuration, etc.). In one embodiment, the standard configuration 302 is provided for use in a noncombatant vehicle (e.g., vehicles that are not up-armored, to provide a comfortable ride for an occupant sitting in the BEAR seat 300 and lower cost in the standard configuration 302, a passenger vehicle, a recreational vehicle, etc.). The seat portion 360 may be provided as a kit (e.g., an A-kit, etc.) including at least one of the upper seat cushion 362, the lower seat cushion 370, and the standard insert 420.

Figure 7B:
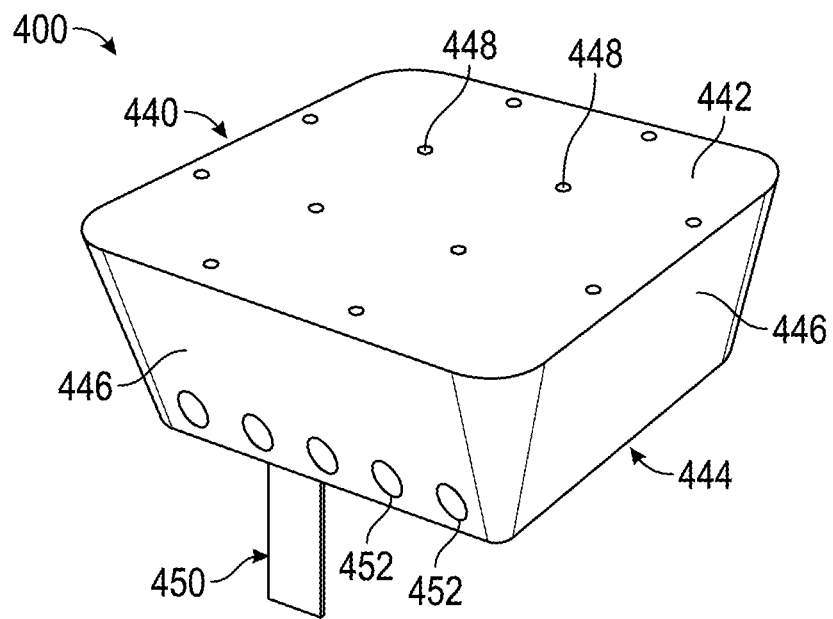

As shown in FIGS. 7B and 10, the seat insert 400 is configured as a second insert, shown as EA insert 440. As shown in FIG. 7B, the EA insert 440 has a first surface, shown as top surface 442, and an opposing second surface, shown as bottom surface 444. According to an exemplary embodiment, the top surface 442 and the bottom surface 444 are spaced a distance apart (e.g., defining a height of the EA insert 440, etc.) that corresponds with the depth of the seat cavity 372 within the seat portion 360. In other embodiments, the top surface 442 and the bottom surface 444 are spaced a different distance apart such that the EA insert 440 is recessed within or extends from the seat cavity 372. As shown in FIG. 7B, the EA insert 440 includes an edge, shown as insert edge 446, that extends around the periphery of the EA insert 440. According to the exemplary shown in FIG. 7B, the insert edge 446 is tapered and corresponds with a tapered edge of the seat cavity 372 to securely hold the EA insert 440 in place, while still allowing easy removal of the EA insert 440 from the seat cavity 372. In other embodiments, the insert edge 446 is otherwise shaped (e.g., curved, straight, etc.). As shown in FIG. 7B, the top surface 442 and the insert edge 446 define a plurality of apertures, shown as thermal apertures 448 and thermal apertures 452, respectively. According to an exemplary embodiment, the thermal apertures 448 and the thermal apertures 452 extend through at least a portion of the EA insert 440. The apertures define a plurality of air flow passages configured to allow air to flow into and out of the EA insert 440 (e.g., as the military vehicle 10 encounters various bumps causing an occupants weight to shift up and down and the EA insert 440 to pump air from the cab to warm or cool the insert, etc.). As shown in FIG. 10, the EA insert 440 is disposed within the seat cavity 372 of the seat portion 360 positioned between the lower seat cushion 370 and the upper seat cushion 362. Thus, the BEAR seat 300 is in a second configuration, shown as EA configuration 304 (e.g., a B-kit configuration, etc.). The EA configuration 304 may be used in an up-armored vehicle such as the military vehicle 10. The seat portion 360 may be provided as a kit (e.g., a B-kit, etc.) including at least one of the upper seat cushion 362, the lower seat cushion 370, and the EA insert 440 (e.g., facilitating the retrofit of A-kit configuration seats, etc.).

In some embodiments, the BEAR seat 300 is configured to receive and/or includes a plurality of different standard inserts 420 and/or EA inserts 440. The BEAR seat 300 may be thereby configured to (i) provide varying levels of comfort, performance (e.g., energy attenuation, etc.), and/or ride quality and/or (ii) accommodate for various temperature conditions (e.g., warm weather, cold weather, etc.). By way of example, a first standard insert 420 may be configured to be used with one vehicle (e.g., based on the suspension characteristics thereof, etc.) while a second standard insert 420 may be configured to be used with another vehicle (e.g., based on the suspension characteristics thereof, etc.). By way of another example, a first standard insert 420 may be configured to be used for on-highway operations, while a second standard insert 420 may be configured to be used for off-highway operations. The first standard insert 420 and the second standard insert 420 may provide different energy attenuation profiles. For example, the on-highway insert may be configured to provide increased comfort for longer drives, while the off-highway insert may be configured to provide increased energy attenuation to reduce the magnitude, duration of shock, and/or acceleration applied to the occupant (e.g., when encountering obstacles such as rocks, holes, etc.).

By way of another example, a first EA insert 440 may be configured to be used with one vehicle (e.g., based on the blast characteristics thereof, etc.) while a second EA insert 440 may be configured to be used with another vehicle (e.g., based on the blast characteristics thereof, etc.). By way of yet another example, a first EA insert 440 may be configured for a first occupant weight class, while a second EA insert 440 may be configured for a second occupant weight class. By way of still another example, a first EA insert 440 may be configured to provide a first energy attenuation profile, while a second EA insert 440 may be configured to provide a second energy attenuation profile. By way of an additional example, a first EA insert 440 may be configured to accommodate a first occupant profile (e.g., to accommodate a 95th percentile male, etc.), a second EA insert 440 may be configured to accommodate a second occupant profile (e.g., to accommodate a 5th percentile female, etc.), a third EA insert 440 may be configured to accommodate a third occupant profile (e.g., to accommodate a 50th percentile male, etc.), etc.

By way of yet another example, a first EA insert 440 may be configured for cold weather use, while a second EA insert 440 may be configured for warm weather use. Applicant has discovered that certain materials provide energy attenuation profiles that vary with temperature. The first EA insert 440 configured for cold weather use may be configured to provide a target energy attenuation profile within one temperature range, while the second EA insert 440 configured for warm weather use may be configured to provide a target energy attenuation profile within a second, warmer temperature range. The first and second temperature ranges may be independent or may at least partially overlap. The BEAR seat 300 may therefore be configured to accommodate various operating conditions, operator profiles, etc. without requiring replacement of the entire seat assembly. The BEAR seat 300 may be configured to receive and/or may provide various combinations and/or permutations of the various inserts described herein.

Figure 12:
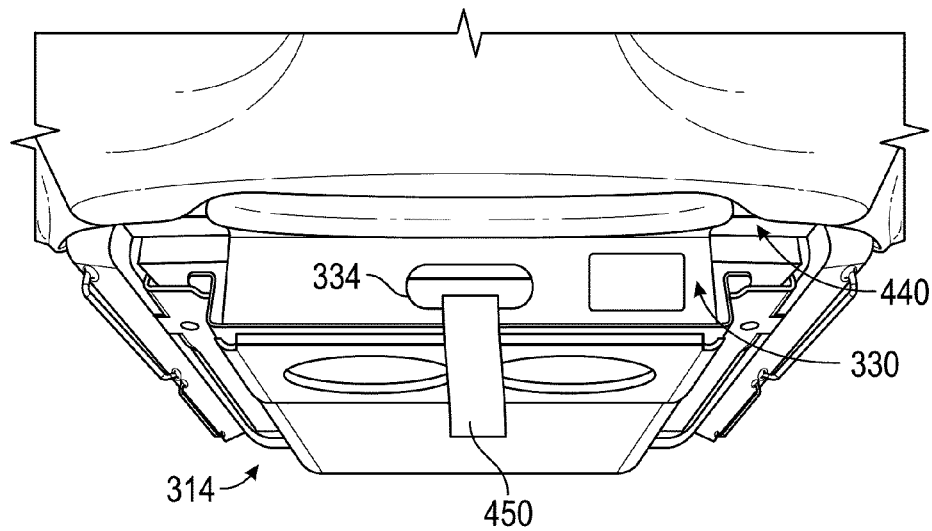

As shown in FIG. 7B, the EA insert 440 includes an indicator, shown as indicator 450. According to the exemplary embodiment shown in FIG. 7B, the indicator 450 is an indicator tag. As shown in FIG. 12, an indicator aperture 334 of the front bracket 330 of the seat pan 314 is configured to receive the indicator 450 such that the indicator 450 is readily visible (e.g., the indicator tag may extend through the indicator aperture 334, etc.). In other embodiments, the indicator 450 is another type of indicator (e.g., an indicator window, etc.) and/or is positioned elsewhere (e.g., on the BEAR seat 300, etc.). By way of example, inserting the EA insert 440 into the seat cavity 372 may actuate an indicator mechanism such that the indicator 450 is displayed (e.g., through an indicator window, etc.). The indicator 450 is configured to identify the BEAR seat 300 as being in the EA configuration 304 (e.g., blast ready, etc.).

According to an exemplary embodiment, the EA insert 440 is configured to attenuate energy (e.g., mitigate, dissipate, lessen, etc.) from an impact encountered by the military vehicle 10 (e.g., a blast from an improvised explosive device ("IED"), a grenade, a rocket propelled grenade; a collision between the military vehicle 10 and another vehicle, a building, an obstacle, etc.; etc.). The EA insert 440 may be configured such that an occupant sitting in the BEAR seat 300 does not interact with the seat pan 314 during the impact (e.g., the occupant cannot stroke into the EA insert 440 and contact the seat pan 314, etc.) even if positioned off center (e.g., slouching towards the front, laterally offset to a side, etc.).

In one embodiment, the EA insert 440 is recoverable and therefore resets (e.g., is elastic, springs back, etc.) following an impact. A recoverable EA insert 440 may provide further protection for an occupant sitting in the BEAR seat 300. By way of example, the military vehicle 10 and the occupants within may experience two impacts during an IED blast. A first impact from the initial blast (e.g., lifting the military vehicle 10 off of the ground, etc.) and a second impact resulting from the subsequent impact between the military vehicle 10 and the ground following the blast, referred to as "slam down". The recoverable EA insert 440 is configured to stroke (e.g., deform, compress, etc.) during the first impact to attenuate the energy from the blast that propagates through the BEAR seat 300 to the occupant. The stroke causes the recoverable EA insert 440 to deform during the first impact (e.g., from the weight of the occupant on the top surface 442 and the energy from the blast propagating to the bottom surface 444, etc.). In response to the blast, the military vehicle 10 may lift off of the ground. On the way down, the weight on the top surface 442 may decrease (e.g., from free fall conditions, etc.) and the energy from the blast may have dissipated (e.g., substantially dissipated, etc.). During the descent, the recoverable EA insert 440 is configured to return to its original uncompressed form, thereby providing sufficient support and energy attenuation for the occupant during the subsequent slam down, according to an exemplary embodiment. The recoverable EA insert 440 is configured to stroke once again to attenuate the energy from the slam down (e.g., the second impact, etc.) that propagates through the BEAR seat 300 to the occupant. The second stroke causes the recoverable EA insert 440 to deform during the second impact (e.g., from the weight of the occupant on the top surface 442 and the energy from the slam down propagating to the bottom surface 444, etc.). In another embodiment, the EA insert 440 is non-recoverable such that an impact causes the EA insert 440 to plastically deform (e.g., the EA insert 440 crushes to attenuate the energy and retains a deformed structure following impact, etc.).

The EA insert 440 may be positioned on and/or within the BEAR seat 300 to mitigate impact energy from various directions. According to the exemplary embodiment shown in FIG. 12, the EA insert 440 is positioned within the seat cavity 372 to attenuate energy from impacts above and/or below the military vehicle 10 (e.g., from an impact to a deflector, the roof 201, etc.). In some embodiments, the EA insert 440 is positioned within the back cavity 359 and/or the head rest 352 to attenuate energy from impacts to the front and/or rear of the military vehicle 10. In some embodiments, the EA insert 440 is positioned within at least one of the side bolster supports 358, the bolsters 366, and the head rest 352 (e.g., to further protect lateral head motion, etc.) to attenuate energy from impacts to the sides of the military vehicle 10. In other embodiments, the EA insert 440 is otherwise positioned on or within the BEAR seat 300. In some embodiments, the BEAR seat 300 includes a plurality of EA inserts 440 positioned to attenuate energy from vertical impacts, lateral impacts, and/or longitudinal impacts.

According to an exemplary embodiment, the EA insert 440 is made of a polymeric energy attenuating material. In other embodiments, the EA insert 440 is made of another energy attenuating material (e.g., foam, etc.). According to another exemplary embodiment, an internal structure of the EA insert 440 defines voids and/or passages such that air may flow within the internal structure. The material and/or shape of the internal structure may define deformation properties (e.g., the stroke reaction, the amount of energy attenuation, etc.) of the EA insert 440 during an impact. The deformation properties may be tuned to allow an occupant to stroke into the EA insert 440 at a controlled rate. According to an exemplary embodiment, the EA insert 440 is configured to yield a generally "soft" reaction through the first few inches of stroke (e.g., deformation, etc.). In such an embodiment, the EA insert 440 is tuned to protect against impacts inducing a substantially high strain rate. In some embodiments, the EA insert 440 is used with a traditional stoking blast seat that is configured to be efficient at lower strain rates and is sensitive to high-rate inputs. Combining the two may provide a significant increase in energy attenuation such that one EA handles the lower velocity inputs and the other protects against the higher velocity inputs.

According to the exemplary embodiment shown in FIGS. 11-14, the seat pan 314 includes a plurality of apertures configured to correspond with the thermal apertures 448 and the thermal apertures 452 of the EA insert 440. The deformation properties of the EA insert 440 may be temperature dependent such that the energy attenuation characteristics of the EA insert 440 may perform differently in warmer climates than in colder climates. By way of example, the military vehicle 10 may be used in warm climates (e.g., desert locations, etc.) and cold climates (e.g., artic locations, etc.). The warmer temperatures may cause the EA insert 440 to heat up and become more flexible (i.e., deform more easily), while colder temperatures may cause the EA insert 440 cool, becoming more stiff (i.e., deform less easily). The corresponding apertures of the seat pan 314 and the EA insert 440 facilitate pumping temperature controlled air (e.g., via an HVAC system of the military vehicle 10, etc.) from the interior of the military vehicle 10 into passages of the EA insert 440 to reduce the temperature differential between the two to provide desired deformation properties. By way of example, heated air from within the EA insert 440 may be pumped or otherwise flow out (e.g., when the EA insert 440 is compressed, etc.). Air conditioned air may be pumped into the EA insert 440 when the EA insert 440 expands (e.g., as the vehicle encounters various bumps, pot holes, etc.). By way of another example, cooled air from within the EA insert 440 may be pumped or otherwise flow out (e.g., when the EA insert 440 is compressed, etc.). Heated air may be pumped into the EA insert 440 when the EA insert 440 expands. The military vehicle 10 may include one or more elements (e.g., conduits, ducts, etc.) configured to facilitate fluidly, thermally, or otherwise coupling HVAC components (e.g., air conditioning condenser, etc.) of the military vehicle 10 to the seat pan 314 and/or the EA insert 440. The one or more elements and/or the HVAC components may be controlled to regulate the temperature of the EA insert 440 (e.g., to provide a target temperature for EA insert 440 such that EA insert 440 provides a target energy attenuation profile, etc.).

As shown in FIGS. 11-13C, the seat pan 314 defines a plurality of apertures configured to directly or indirectly provide air flow to the EA insert 440 to control the temperature thereof. Some of the apertures of the seat pan 314 may be positioned to direct air flow to one or more flow passages within the EA insert 440 (e.g., to provide convective cooling, to provide convective heating, etc.), while others may be positioned to direct flow to at least one of the insert edge 446 of the EA insert 440 and the lower seat cushion 370 (e.g., to provide conductive cooling, to provide conductive heating, etc.).

Figure 13A:
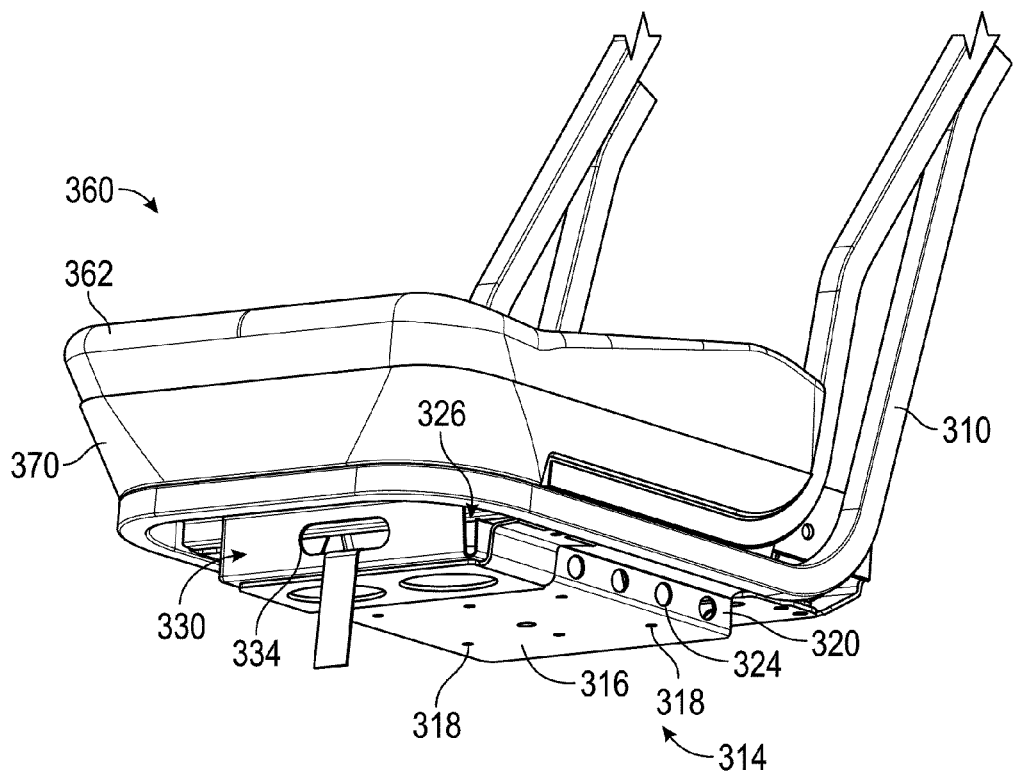
FIGS. 13A-13C are various views of a lower portion of a seat, according to an exemplary embodiment.
Figure 13B:
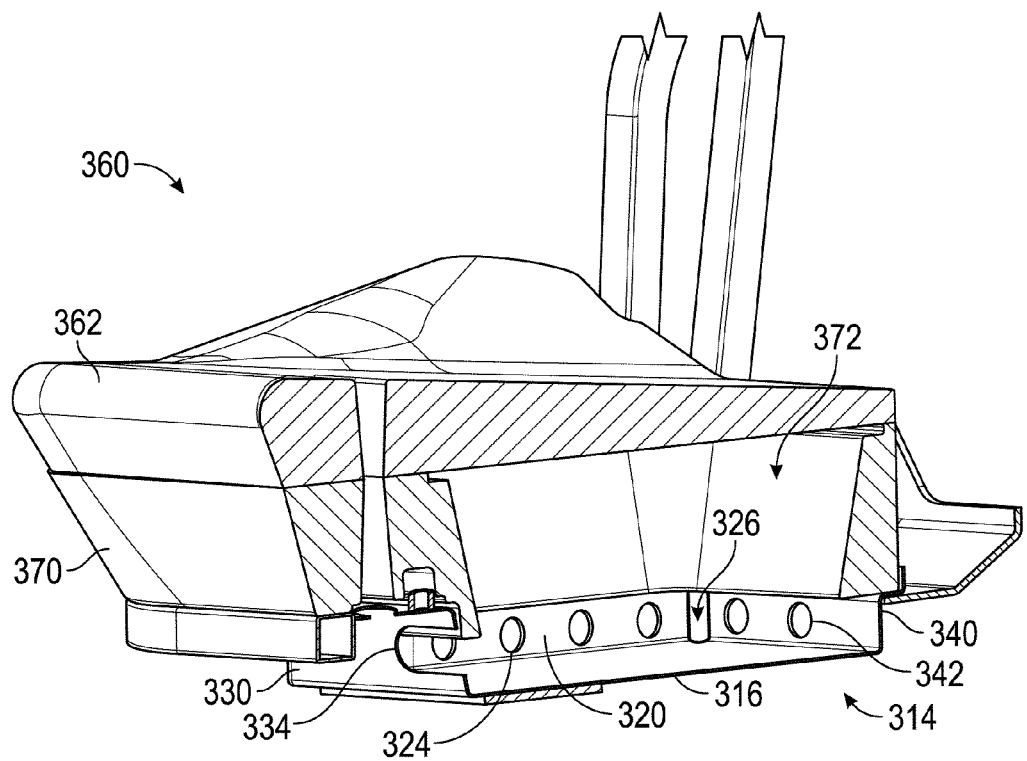
Figure 13C:
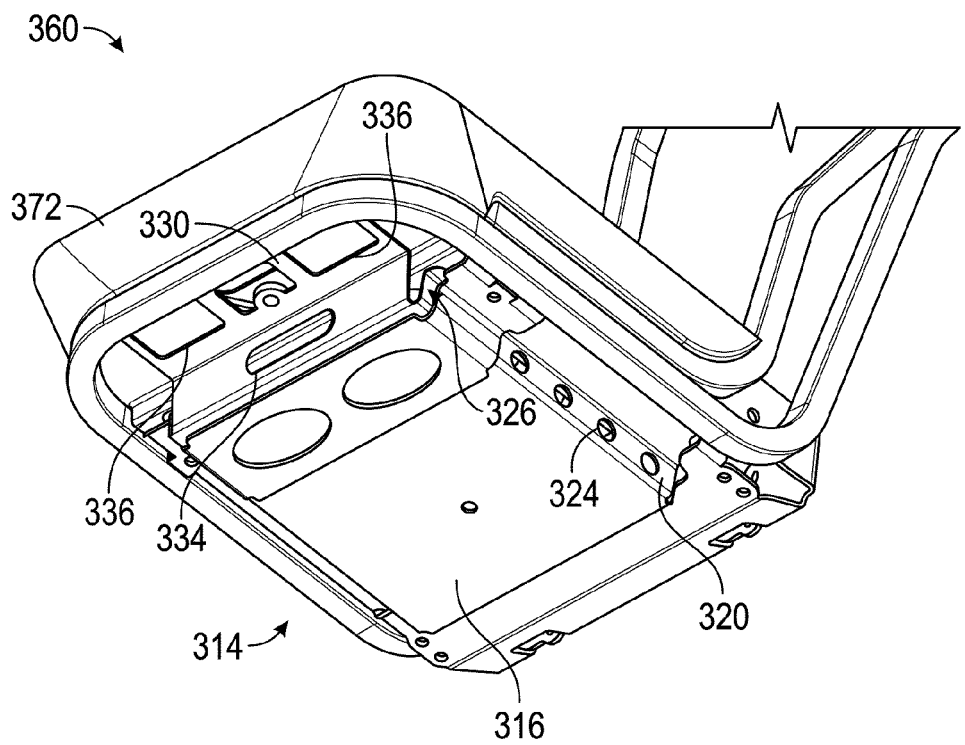
Figure 14:
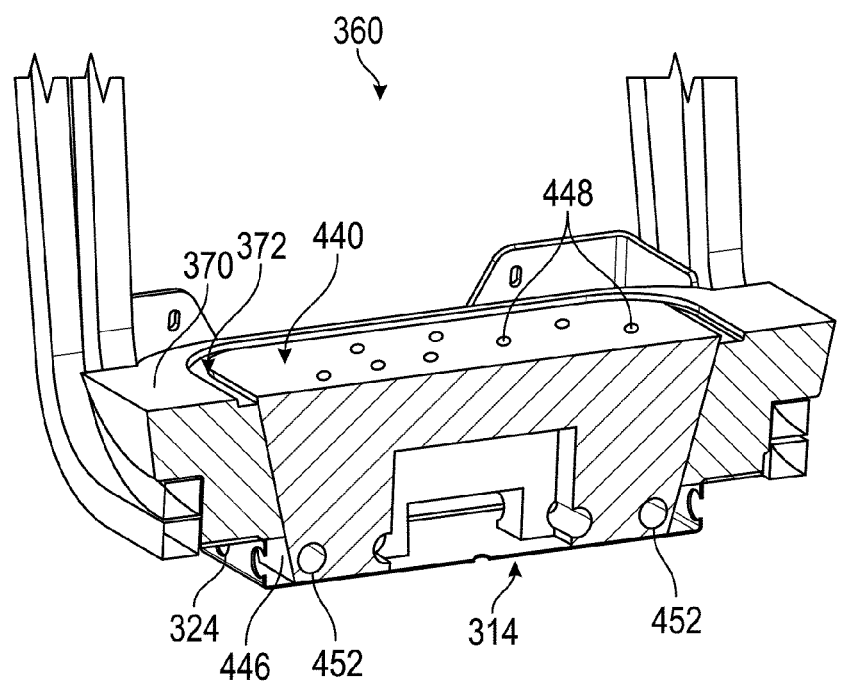
FIG. 14 is a cross-sectional view of a seat insert within a lower portion of a seat, according to an exemplary embodiment.

As shown in FIGS. 13A-13C, the side brackets 320 define a plurality of apertures, shown as side thermal apertures 324. According to an exemplary embodiment, the side thermal apertures 324 are positioned to allow air flow to interact with at least one of the lower seat cushion 370 and the insert edge 446. In some embodiments, the EA insert 440 includes apertures that correspond with the side thermal apertures 324. As shown in FIG. 13C, the front bracket 330 defines a plurality of apertures, shown as thermal apertures 336. According to the exemplary embodiment shown in FIGS. 13A and 13C, the indicator aperture 334 and the thermal apertures 336 of the front bracket 330 are positioned to direct flow to at least one of the insert edge 446, the thermal apertures 452 of the EA insert 440, and the lower seat cushion 370. As shown in FIG. 13B, the rear bracket 340 defines a plurality of apertures, shown as thermal apertures 342, positioned to correspond with and direct air flow into the thermal apertures 452 of the EA insert 440. As shown in FIGS. 11 and 13A, the plate 316 of the seat pan 314 defines a plurality of apertures, shown as thermal apertures 318, positioned to correspond with and direct airflow into the plurality of thermal apertures 448 of the EA insert 440. As shown in FIGS. 11 and 13A-13B, the seat pan 314 defines a plurality of slots, shown as thermal slots 326. According to an exemplary embodiment, the thermal slots 326 are positioned to direct air flow to at least one of the insert edge 446, the thermal apertures 452 of the EA insert 440, and the lower seat cushion 370. As shown in FIG. 11, the rear bracket 340 defines a plurality of apertures, shown as thermal apertures 344, thermal slot 346, and thermal cutouts 348. According to an exemplary embodiment, the thermal apertures 344, the thermal slot 346, and the thermal cutouts 348 are positioned to direct air flow to at least one of the upper seat cushion 362 and the lower seat cushion 370. The upper seat cushion 362 and/or the lower seat cushion 370 may define various apertures to correspond and/or align with the various apertures of the seat pan 314 and/or the EA insert 440.

According to the exemplary embodiment shown in FIG. 11, the plate 316 of the seat pan 314 defines an aperture, shown as deflection aperture 900. The deflection aperture 900 may facilitate at least one of manually and automatically determining an available stroke (e.g., amount of deflection remaining after applying weight of an occupant and gear, etc.) of the EA insert 440 when loaded (e.g., by an occupant sitting on the BEAR seat 300, etc.). According to an exemplary embodiment, the EA insert 440 defines a corresponding aperture positioned to align with the deflection aperture 900. The corresponding aperture of the EA insert 440 extends to a reference surface. In one embodiment, the reference surface is the top surface 442 of the EA insert 440. In another embodiment, the reference surface is positioned between the top surface 442 and the bottom surface 444 of the EA insert 440.

In one embodiment, the available stroke of the EA insert 440 is manually determined by inserting a measurement device (e.g., calibration stick, tape measure, etc.) into the deflection aperture 900 to measure the deflection of the EA insert 440. If the available stoke is below a threshold (e.g., an occupant is overloading the EA insert 440, available stroke is not sufficient, etc.), the measurement may indicate that an occupant needs to remove some gear to reduce the loading on the EA insert 440. In another embodiment, the EA insert 440 includes a calibrated element (e.g., a string having a specific length with indicators positioned at an end thereof, etc.) positioned to align with the deflection aperture 900. The calibrated element may extend through the deflection aperture 900 to indicate the deflection (e.g., the available stroke, the state, the position, the configuration, etc.) of the EA insert 440. By way of example, the calibrated element may include a string having a first indicator (e.g., a green portion, etc.) and a second indicator (e.g., a red portion, etc.) at an end thereof. The deflection of the EA insert 440 may be within a target range when the first indicator extends through the deflection aperture 900. Conversely, the deflection of the EA insert 440 may be outside a target range when the second indicator extends through the deflection aperture 900. In other embodiments, the deflection of the EA insert 440 is determined by a measurement device (e.g., a laser, a string potentiometer, etc.) interengaging with the deflection aperture 900 and/or embedded within the EA insert 440 to measure the deflection of the EA insert 440. If the available stoke is below a threshold, the measurement device may provide an error signal to an output device to display a warning indicating that an occupant may need to remove some gear to reduce the loading on the EA insert 440 or that the EA insert 440 may need to be replaced.

According to the exemplary embodiment shown in FIGS. 8-12, the BEAR seat 300 facilitates easy exchange or inspection of the seat insert 400. As shown in FIGS. 8-9, the seat cover 384 includes retaining members, shown as clasps 388. According to an exemplary embodiment, the clasps 388 are configured to correspond with a retaining surface of the seat pan 314 to removably couple the seat cover 384 around the seat portion 360 and to the seat pan 314. The clasps 388 may be disengaged (e.g., decoupled, etc.) from the seat pan 314, and the seat cover 384 may thereafter be removed from the seat portion 360, exposing the upper seat cushion 362 and the lower seat cushion 370. In an alternative embodiment, the seat cover 384 includes a zipper or other quick-release device that extends around at least a portion of the periphery of the seat portion 360 to facilitate accessing the upper seat cushion 362 and the lower seat cushion 370. As shown in FIGS. 8-10, the upper seat cushion 362 may be removed or folded back to expose the seat insert 400 (e.g., the standard insert 420, the EA insert 440, etc.) positioned within the seat cavity 372 of the lower seat cushion 370.

As shown in FIG. 9, the seat insert 400 may be removed from the seat cavity 372 of the lower seat cushion 370. By way of example, the standard insert 420 may be replaced with the EA insert 440 to selectively reconfigure the BEAR seat 300 from the standard configuration 302 (e.g., the A-kit configuration, etc.) to the EA configuration 304 (e.g., the B-kit configuration, etc.). As shown in FIG. 11, the entire seat portion 360 may be removed from the seat pan 314.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the vehicle and seat system as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from the scope of the present disclosure or from the spirit of the appended claims.

The invention claimed is:

1. A seating system for a vehicle, comprising:
   a frame configured to be coupled to a chassis of the vehicle;
   a seat cushion supported by at least one of the frame and a floor of the vehicle;
   a first recoverable insert configured to provide a first energy attenuation response; and
   a second recoverable insert configured to provide a second energy attenuation response different than the first energy attenuation response,
   wherein the seat cushion defines a cavity shaped to interchangeably receive either the first recoverable insert or the second recoverable insert to thereby selectively vary an energy attenuation provided by the seating system, wherein the second recoverable insert includes an identifier configured to indicate that the second recoverable insert is installed within the cavity defined by the seat cushion, wherein the frame defines an aperture, and wherein the identifier includes a tag extending through the aperture and hanging below the frame.

2. The seating system of claim 1, wherein the first recoverable insert defines an A-kit insert and the second recoverable insert defines a B-kit insert, wherein the B-kit insert provides a level of threat protection that is greater than a level of threat protection provided by the A-kit insert.

3. A seating system for a vehicle, comprising:
   a frame configured to be coupled to a chassis of the vehicle;
   a seat cushion supported by at least one of the frame and a floor of the vehicle;
   a first recoverable insert configured to provide a first energy attenuation response; and
   a second recoverable insert configured to provide a second energy attenuation response different than the first energy attenuation response,
   wherein the seat cushion defines a cavity shaped to interchangeably receive either the first recoverable insert or the second recoverable insert to thereby selectively vary an energy attenuation provided by the seating system and wherein the frame defines an aperture and the second recoverable insert defines a passage that corresponds with the aperture, the aperture and the passage defining a flow path that places the second recoverable insert in fluid communication with an interior volume of the vehicle.

4. A seating system for a vehicle, comprising:
   a frame configured to be coupled to a chassis of the vehicle;
   a seat cushion supported by at least one of the frame and a floor of the vehicle;
   a first recoverable insert configured to provide a first energy attenuation response; and
   a second recoverable insert configured to provide a second energy attenuation response different than the first energy attenuation response,
   wherein the seat cushion defines a cavity shaped to interchangeably receive either the first recoverable insert or the second recoverable insert to thereby selectively vary an energy attenuation provided by the seating system, wherein the frame includes a seat pan upon which the seat cushion is disposed, the seat pan defining a first aperture, and wherein the second recoverable insert forms a second aperture that corresponds with the first aperture.

5. The seating system of claim 4, wherein the seating system includes a measurement system positioned to evaluate an available stroke of the second recoverable insert from below the seat pan by interengaging with the first aperture and the second aperture.

6. The seating system of claim 5, wherein an inner volume of the second recoverable insert and a reference surface of the second recoverable insert cooperate to define the second aperture, wherein the measurement system is configured to engage the reference surface to evaluate the available stroke of the second recoverable insert.

7. The seating system of claim 6, wherein the measurement system comprises at least one of a measuring tape, a calibrated measuring element, a string potentiometer, and a laser measurement device.

* * * * *